March 13, 1962   A. L. CLARK   3,024,560
FISHING DEVICE
Filed June 6, 1960   2 Sheets-Sheet 1

INVENTOR
AUBREY L. CLARK

March 13, 1962  A. L. CLARK  3,024,560
FISHING DEVICE

Filed June 6, 1960  2 Sheets-Sheet 2

INVENTOR
AUBREY L. CLARK

United States Patent Office 3,024,560
Patented Mar. 13, 1962

3,024,560
FISHING DEVICE
Aubrey L. Clark, 404 Taylor Drive, Greenwood, Miss., assignor of one-half to Norman C. Brewer, Jr., Greenwood, Miss.
Filed June 6, 1960, Ser. No. 34,270
4 Claims. (Cl. 43—17)

This invention relates to a device used for fishing and more specifically to a self-contained fishing instrument having a flashing light indicating means therein.

Bobs or floats having a light source therein for use with fishing lines are generally known. These floats are attached to the end of the line and act in the same manner as a normal fishing float. These devices are usually constructed in such a manner that when a fish strikes the line it will cause a bulb to either light or flash on or off according to the pressure exerted on the line. These devices are, of course, limited to use in conjunction with the usual fishing pole and line and require the fisherman to be in constant attention of the device itself. A free-floating self-contained fishing device has the advantage that a person can use one or more and still stay only within the general vicinity of the fishing area without constantly attending the particular devices.

Accordingly, it is an object of this invention to provide a free-floating fishing device which operates properly with no constant attention needed on the part of the user.

A further object of this invention is to provide a free-floating device which is simple in construction and economical of manufacture.

A still further object of this invention is to provide a free-floating fishing device having an illuminating means therein for indicating a strike on the line by a fish.

Another object of this invention is to provide a free-floating fishing device wherein a limited number of parts are used which are easily replaceable and wherein the entire structure is of a water-tight construction.

Yet another object of this invention is to provide a free-floating fishing device which may be adjusted as to its various connections according to the use for which it is intended.

These and other objects and advantages of my invention will become apparent from the following description of the construction and operation of the fishing device of the present invention when taken in conjunction with the drawings wherein.

Figure 1:
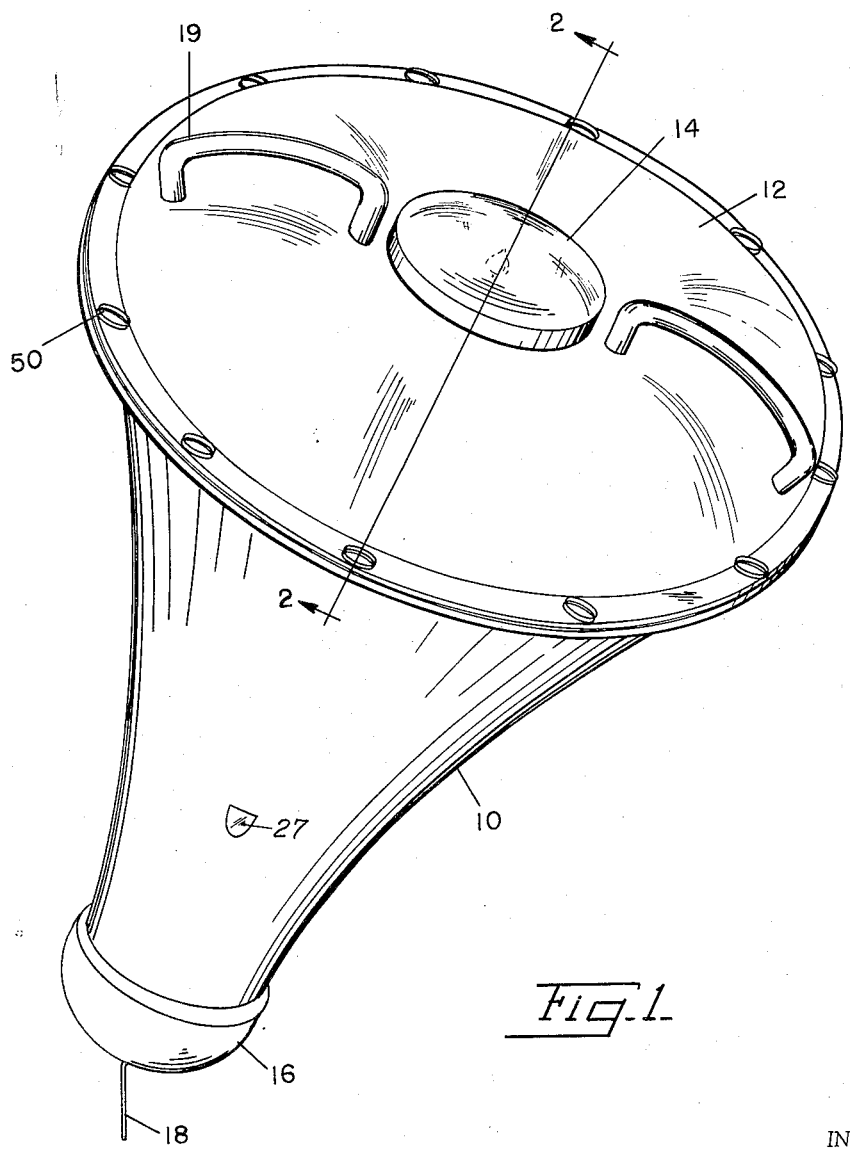
FIG. 1 is a perspective view of the assembled device of the present invention.

The fishing device of the present invention is composed of three major parts. The main or lower shell 10 is of a conical form open at its upper end. The cover 12 is dome shaped and is secured to the open portion of the conical lower shell. A translucent upper cap 14 is secured to the cover portion 12 and a lower cap 16 is secured to the main shell 10 at the lower end thereof. Handles 19 may be secured to the cover 12 in order to facilitate recovery of the device, and the line 18 extends downwardly from cap 16 as shown in the drawings. The device is watertight and may be constructed of any rigid material. In one preferred embodiment, a rigid plastic material has proven to be very satisfactory in that it will not rust and needs very little, if any, cleaning, painting or upkeep.

Figure 2:
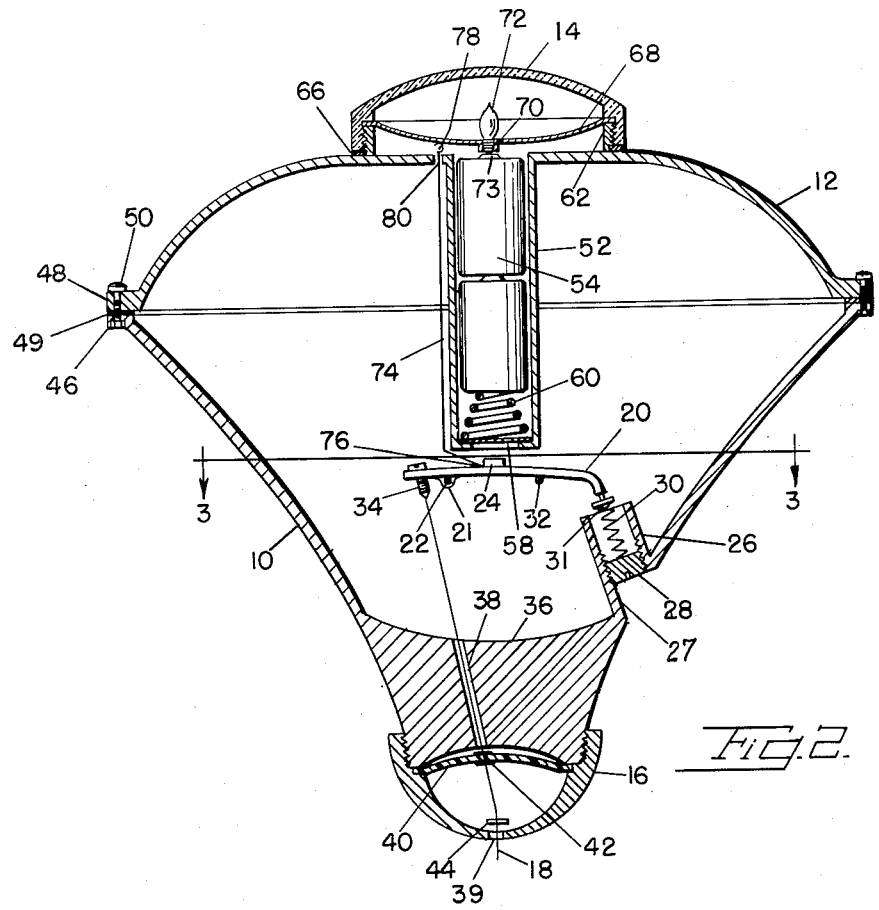
FIG. 2 is a sectional elevational view taken along the lines 2—2 of the device shown in FIG. 1.
Figure 3:
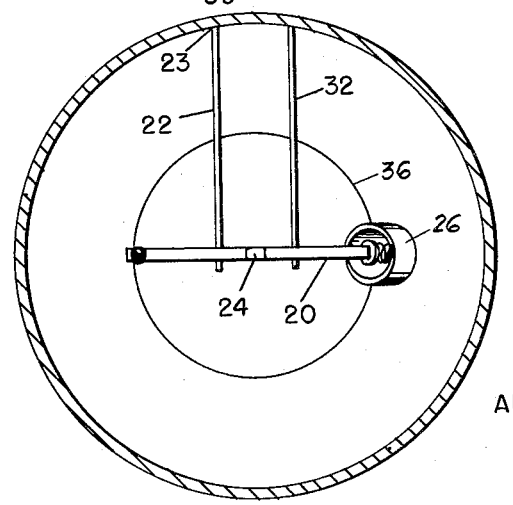
FIG. 3 is a top view of the main shell of the device with the cover portion removed.

FIGS. 2 and 3 show the device and the details of its construction and use. An arm 20 of dielectric material is pivotally mounted within the main shell 10 on a rod 22 which extends laterally from the inner surface 23 of shell 10. A second rod 32, substantially parallel to rod 22, is also secured to the inner side of the main shell in order to provide a means for limiting the rotation of arm 20 about rod 22. An electrically conductive contact 24 is secured centrally to the top surface of arm 20. The main shell 10 has a cylindrical reentrant portion 26 in order to accommodate an adjustable means for controlling the movement of arm 20. The reentrant portion 26 is internally threaded and an adjustable nut 28 is threaded therein. In order to provide a means for biasing the arm 20 against rod 32, a tension spring 30 is connected between end 31 of arm 20 and the inside face of adjustable nut 28. The line 18 is secured to the other end of the rotatable rod 20 by means such as a screw 34.

In order that the line may pass outwardly of the device, an opening 38 is provided through the base portion 36 of the main shell 10. The line 18 extends downwardly through opening 38 and port 39 in the lower cap 16. As can be seen, the lower cap 16 is threadedly secured to the base portion 36 of the shell 10. To prevent water from passing through opening 38 into the inner portion of the main shell, a circular flexible diaphragm 40, such as rubber, is secured between the base portion 36 and the cap 16. The line 18 passes through diaphragm 40 and is secured thereto by metal washers 42 which are so designed that they form a water-tight seal by compressing the diaphragm about the line.

A line stop 44 is secured to the line within the compartment created by the cap 16. The line stop is of a dimension substantially greater than the port 39 so that it will limit the movement of the line and, thus, the rotation of rod 20, to the point wherein the stop 44 comes into contact with that portion of the cap 16 surrounding the port 39. Thus, strain and damage to the rod 20 or breakage thereof is effectively eliminated. Any further force exerted by the fish will tend only to pull the jug further down into the water.

In order to seal the jug at the upper end thereof, a watertight seal is formed between the cover 12 and the main shell 10. In a preferred embodiment, this is accomplished by creating a flange 46 on the lower shell which mates with a flange 48 on the cover. A gasket or washer 49 of resilient material, such as rubber, is placed between the flanges 46 and 48 and the cover is secured to the base member 10 by means of bolts 50 or the like. To provide a compartment for the power source, such as batteries, a subtending hollow cylindrical portion 52 extends downwardly into the shell 10 from the cover 12. This cylinder may be part of the plastic cover 12 and molded therewith. The base of cylindrical portion 52 has an opening therein and an electrical conducting plate 58 is secured within the cylinder over the opening. The plate 58 is directly above and closely adjacent to the contact member 24 on the arm 20 and supports the batteries 54 within the compartment 52 by a coiled contact spring 60.

Secured to the cover 12 or molded therewith is an externally threaded hollow cylindrical element 62 extending upwardly from the cover and surrounding the compartment 52. A translucent upper cap 14 is threadedly secured to the cylindrical portion 62 and a watertight seal 66 is provided between the cap 14 and the cylindrical portion 62. A reflector 68, made of an electrically conductive material, is secured between the cap 14 and the upper portion of cylindrical element 62 in order to increase light dissemination and also to provide a threaded portion 70 for receipt of an incandescent lamp 72.

When the cap, reflector and lamp are firmly secured to the cover 12, the lamp presses downwardly upon batteries 54 which are spring biased upwardly by metal spring 60 in contact with the metal plate 58. In order to provide a means for completing the circuit through the batteries and the lamp, a connecting means 74, such as a thin spring steel wire, is secured at its lower end 76 to contact 24 by welding or soldering. Wire 74 then passes around compartment 52 and extends upwardly through a small opening 80 within cover 12. The wire is preferably bent in a loop configuration 78 at the top thereof to assure a tight spring contact against metal reflector 68.

As is now apparent, a pressure exerted downwardly on line 18, and having a sufficient force to overcome the bias exerted by tension spring 30 will cause arm 20 to rotate about rod 22. This rotation will cause metal contact 24 to abut against metal plate 58, thus completing the electrical circuit through the batteries 54, light 72, reflector 68, wire 74, contact 24, plate 58 and spring 60, and the incandescent lamp 72 will light. If the force occurs only part of the time, as will be the occasion when a fish is on the line, the light will be on only that portion of the time and a flashing effect will occur.

The amount of tension necessary to overcome the spring can be adjusted by the nut 28. By turning the nut clockwise, the tension in the spring will be reduced and a smaller downward force on line 18 will cause the lamp to light. However, if the tension is desired to be increased for any purpose, such as heavier bait, swift water or any such purpose, the nut 28 may be turned counter-clockwise which will increase the tension on the spring and thus require a greater force on line 18 to bring contact 24 into abutment with metal plate 58.

Although a single embodiment of my invention has been illustrated and described, it is to be understood that many changes therein and modifications thereof may be made without departing from the spirit and scope of the invention. The particular shape of the fishing device may be altered so long as it has a buoyancy and stability in water with no external support means required. The inner compartment can be designed to accommodate any type of battery or batteries as desired for a particular use. It is also noted that the various components used in constructing the fishing device may be secured together in any well-known manner and various sealing gaskets or compounds may be used to ensure a watertight construction.

I claim:

1. A fishing device comprising a conical shell open at its upper end, a flange extending from the periphery of said upper end, a first rod secured within said shell, a dielectric arm pivotally mounted on said rod, a metal terminal secured to said arm, there being an internally threaded opening in the side of said shell, an adjustable nut within said threaded opening, a tension spring secured between said nut and one end of said arm, a second rod secured within said shell for limiting the rotation of said arm created by the force of said tension spring, there being an opening through the lower end of said shell, a cap having an aperture therein secured to the lower end of said shell, a flexible diaphragm secured between the periphery of the lower end of said shell and said lower cap, a line secured to the other end of said arm and passing through said opening and said aperture in said lower cap, said line passing through and secured to said diaphragm, a line movement limiting means secured to said line between said lower cap and said diaphragm, said limiting means being substantially larger than said aperture in said lower cap; a dome shaped cover having substantially the same diameter as the upper end of said shell, a flange extending from the periphery of said cover, means for securing the flange of said cover to the flange of said shell, a subtending cylindrical portion in said cover, said cylindrical portion having an opening in the base thereof, said opening being vertically disposed above said metal terminal on said arm, a metal plate covering said opening within said cylindrical portion, a translucent upper cap secured to said cover above said cylindrical portion, a metal reflector secured between said upper cap and said cover, said reflector being adapted to receive an incandescent lamp, handles secured to said cover and electrical connecting means between said reflector and said metal terminal on said arm, said terminal being moved into contact with said metal plate when said arm is rotated by a force on said line sufficient to overcome the bias of said spring.

2. A fishing device comprising a shell open at its upper end, a first rod secured within said shell, a dielectric arm pivotally mounted on said first rod, a metal terminal secured to said arm, a second rod member secured within said shell, spring means at one end of said arm for biasing said arm against said second rod, there being an opening through the lower end of said shell, a cap having an aperture therein secured to the lower end of said shell, a flexible diaphragm secured between the periphery of the lower end of said shell and said lower cap, a line secured to the other end of said arm and passing through said opening and said aperture in said lower cap, said line passing through and secured to said diaphragm, means for limiting the movement of said line within said shell; a cover having substantially the same peripheral dimension as the upper end of said shell, means for securing said cover to said shell, a subtending battery compartment in said cover having an electrically conductive base therein, said base being vertically disposed above said metal terminal on said arm, a translucent upper cap secured to said cover above said battery compartment, a metal reflector secured between said upper cap and said cover and adapted to receive an incandescent lamp, and electrical connecting means between said reflector and said metal terminal on said arm, said terminal being moved into contact with said electrically conductive base when said arm is rotated by a force on said line sufficient to overcome the bias of said spring.

3. A fishing device comprising a hollow base portion open at its upper end, a rod mounted within said base portion, a dielectric arm pivotally supported by said rod, a metal terminal secured to said arm, a tension spring secured between said casing and one end to said arm, means for adjusting the tension of said spring, means within said casing for limiting the rotational movement imparted to said arm by said spring, there being an opening through the lower end of said casing, a cap having an aperture therein secured to the lower end of said casing, a flexible diaphragm secured between the periphery of the lower end of said casing and said lower cap, a line secured to the other end of said arm and passing through said opening and said aperture in said lower cap, said line passing through and secured to said diaphragm, a line movement limiting means within said cap, a cover having substantially the same peripheral dimension as the upper end of said casing, means for securing said cover to said shell, a subtending battery compartment in said cover and having a conductive base therein, said compartment being vertically disposed above said metal terminal on said rod, a translucent upper cap secured to said cover above said battery compartment, a reflector secured between said upper cap and said cover, and adapted to receive an incandescent lamp, electrical connecting means between said lamp and said metal terminal on said arm, said terminal being moved into contact with said metal plate when said arm is rotated by a force on said line sufficient to overcome the bias of said spring.

4. A fishing device comprising a shell open at its upper end, a first rod secured within said shell, a dielectric arm pivotally mounted on said first rod, a conductive terminal secured to said arm, there being an opening in the side of said shell, adjustable means secured within said opening, a tension spring secured between said adjustable means and one end of said arm, there being an aperture in the lower end of said shell, a cap having an opening therethrough secured to the lower end of said shell, a flexible member secured between the periphery of the lower end of said shell and said lower cap, a line secured to the other end of said arm and passing through said aperture in said shell and said opening in said lower cap, said line passing through and secured to said flexible member, a line movement limiting device secured to said line, a cover having substantially the same peripheral dimensions as the upper end of said shell, means for securing said cover to said shell, a subtending battery compartment in said cover, said compartment having an opening in the base thereof, said opening in said base being vertically disposed above said metal terminal on said arm, a metal plate covering said opening, a translucent upper cap secured to said cover above said compartment, a metal reflector secured between said upper cap and said cover, said reflector being adapted to receive an incandescent lamp, handles secured to said cover, and electrical connecting means between said reflector and said metal terminal on said arm, said terminal being moved into contact with said metal plate when said arm is rotated by a force on said line sufficient to overcome the bias of said spring.

References Cited in the file of this patent

UNITED STATES PATENTS

| | | |
|---|---|---|
| 2,654,972 | Hollingsworth | Oct. 13, 1953 |
| 2,798,330 | Carraway et al. | July 9, 1957 |